(12) United States Patent
Wang

(10) Patent No.: US 11,546,453 B2
(45) Date of Patent: Jan. 3, 2023

(54) PROJECTION MODULE AND TERMINAL

(71) Applicant: GUANGDONG OPPO MOBILE TELECOMMUNICATIONS CORP., LTD., Guangdong (CN)

(72) Inventor: Lu Wang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 311 days.

(21) Appl. No.: 16/895,700

(22) Filed: Jun. 8, 2020

(65) Prior Publication Data
US 2021/0067619 A1    Mar. 4, 2021

(30) Foreign Application Priority Data

Aug. 28, 2019 (CN) .......................... 201910801130.8

(51) Int. Cl.
*H04M 1/02* (2006.01)
*G02B 27/42* (2006.01)
(Continued)

(52) U.S. Cl.
CPC ........ *H04M 1/0272* (2013.01); *G02B 5/0294* (2013.01); *G02B 5/1814* (2013.01);
(Continued)

(58) Field of Classification Search
CPC . H04M 1/0272; G02B 27/42; G02B 27/4205; G02B 27/4233
See application file for complete search history.

(56) References Cited

U.S. PATENT DOCUMENTS

| 10,571,957 | B2 | 2/2020 | Mathew et al. |
| 2019/0243155 | A1* | 8/2019 | You .................... G02B 27/4233 |
| 2019/0259927 | A1 | 8/2019 | Chern et al. |

FOREIGN PATENT DOCUMENTS

| CN | 108074947 A | 5/2018 |
| CN | 108173989 A | 6/2018 |

(Continued)

OTHER PUBLICATIONS

ISR for PCT application PCTCN2020101773 dated Oct. 13, 2020.
(Continued)

*Primary Examiner* — Ryan D Howard
(74) *Attorney, Agent, or Firm* — Young Basile Hanlon & MacFarlane, P.C.

(57) ABSTRACT

A projection module and a terminal are provided. The projection module includes a base, a housing, a first light source, a second light source and an optical element. The housing is disposed on the base, and defines an accommodating cavity together with the base. The first light source is disposed on the base and arranged in the accommodating cavity. The second light source is disposed on the base and arranged in the accommodating cavity. The optical element is disposed on the housing and includes a diffraction area and a diffusion area. The first light source aligns with the diffraction area, the second light source aligns with the diffusion area, the diffraction area is configured to diffract light passing through the diffraction area, and the diffusion area is configured to diffuse light passing through the diffusion area.

18 Claims, 15 Drawing Sheets

(51) Int. Cl.
    *H05B 47/11*     (2020.01)
    *G02B 5/02*     (2006.01)
    *G02B 5/18*     (2006.01)
    *G03B 21/14*     (2006.01)
    *G03B 21/20*     (2006.01)

(52) U.S. Cl.
    CPC ....... *G03B 21/145* (2013.01); *G03B 21/2013* (2013.01); *H05B 47/11* (2020.01)

(56) References Cited

FOREIGN PATENT DOCUMENTS

| | | |
|---|---|---|
| CN | 108490522 A | 9/2018 |
| CN | 108490572 A | 9/2018 |
| CN | 108490636 A | 9/2018 |
| CN | 108668078 A | 10/2018 |
| CN | 208239782 U | 12/2018 |
| CN | 109167903 A | 1/2019 |
| CN | 209044429 U | 6/2019 |
| CN | 110493400 A | 11/2019 |

OTHER PUBLICATIONS

Extended European Search Report for EP application 20183675.6 dated Dec. 21, 2020.
Indian Examination Report for IN Application 202014025821 dated Nov. 10, 2021. (7 pages).
Communication pursuant to Article 94(3) EPC for EP Application 20183675.6 dated Nov. 26, 2021. (4 pages).
Chinese Office Action with English Translation for ON Application 201910801130.8 dated Apr. 27, 2021. (19 pages).
Second Chinese Office Action with English Translation for Application No. 201910801130.8 dated Jan. 13, 2021.
OA and English translation for CN application 201910801130.8 dated Jul. 3, 2020.

\* cited by examiner

13

PROJECTION MODULE AND TERMINAL

CROSS-REFERENCE TO RELATED APPLICATION(S)

This application claims priority to and benefit of Chinese Patent Application Serial No. 201910801130.8, filed on Aug. 28, 2019, the entire content of which is hereby incorporated by reference.

TECHNICAL FIELD

The present disclosure relates to a field of consumer electronic technologies, and more specifically, to a projection module and a terminal.

BACKGROUND

A mobile phone may have an unlocking function by using a structured light. In this case, the mobile phone is usually provided with a structured light projector and a floodlight, respectively. The structured light projector is configured to project the structured light during 3D imaging, and the floodlight is configured to project the supplemental light during 2D imaging. Both the structured light projector and the floodlight need to work during the unlocking with the structured light. However, the structured light projector and the floodlight are usually two separate modules, thus resulting in the low integration level, and occupying the mounting space in the mobile phone.

SUMMARY

Embodiments of the present disclosure provide a projection module and a terminal.

The projection module according to a first aspect of embodiments of the present disclosure includes a base, a housing, a first light source, a second light source and an optical element. The housing is disposed on the base, and defines an accommodating cavity together with the base. The first light source is disposed on the base and arranged in the accommodating cavity. The second light source is disposed on the base and arranged in the accommodating cavity. The optical element is disposed on the housing, and includes a diffraction area and a diffusion area. The first light source aligns with the diffraction area, the second light source aligns with the diffusion area, the diffraction area is configured to diffract light passing through the diffraction area, and the diffusion area is configured to diffuse light passing through the diffusion area.

The terminal according to a second aspect of embodiments of the present disclosure includes a projection module and a driver. The projection module includes a base, a housing, a first light source, a second light source and an optical element. The housing is disposed on the base, and defines an accommodating cavity together with the base. The first light source and the second light source are disposed on the base and arranged in the accommodating cavity. The optical element is disposed on the housing, and includes a diffraction area aligning with the first light source and a diffusion area aligning with the second light source. The diffraction area is configured to diffract light passing therethrough, and the diffusion area is configured to diffuse light passing therethrough. The driver is connected with the first light source and the second light source, and configured to drive the first light source and the second light source to emit light.

The projection module according to a third aspect of embodiments of the present disclosure includes a base, a housing, a first light source, a second light source and an optical element. The housing is disposed on the base. The first light source and the second light source are disposed on the base and received in the housing. The optical element is disposed on the housing, and covers the first light source and the second light source. The optical element includes a diffraction area aligning with the first light source and a diffusion area aligning with the second light source. The diffraction area is configured to diffract light passing therethrough, and the diffusion area is configured to diffuse light passing therethrough.

Additional aspects and advantages of embodiments of the present application will be given in the following description, some of which will become apparent from the following description or be learned from practices of the present application.

BRIEF DESCRIPTION OF DRAWINGS

The above and/or additional aspects and advantages of the present application will become apparent and easy to understand from descriptions of the embodiments with reference to the drawings.

DETAILED DESCRIPTION

Figure 1:
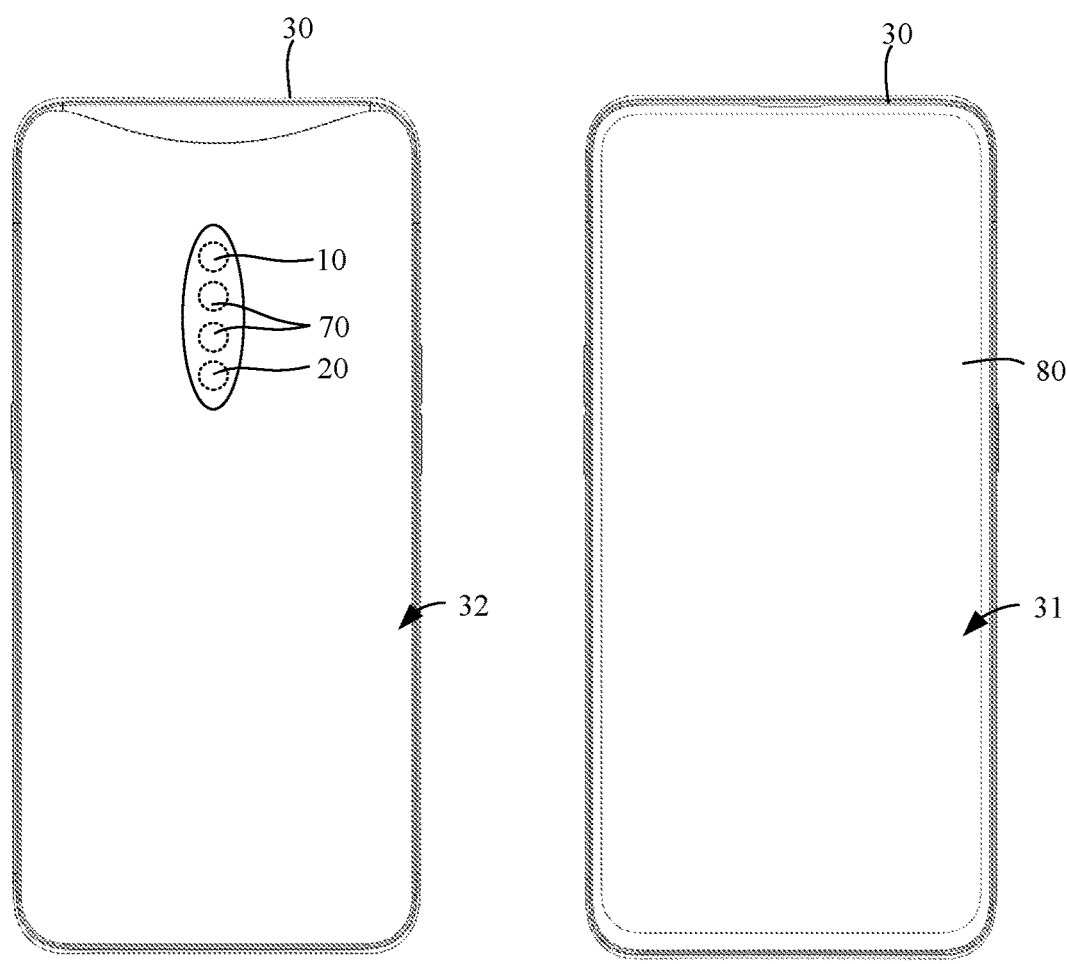
FIG. 1 is a schematic view of a terminal according to an embodiment of the present disclosure.

Embodiments of the present disclosure are further described with reference to the accompanying drawings. Same or similar reference signs in the drawings represent the same or similar components or components that have the same or similar functions from beginning to end.

Moreover, the embodiments described below with reference to the accompanying drawings are just examples used to explain the present disclosure, and cannot be construed as a limitation to the present disclosure.

In the descriptions of the present disclosure, it should be noted that, unless otherwise expressly specified and limited, the first feature "on" or "under" the second feature may be that the first and second features are in direct contact, or that the first and second features are in indirect contact through an intermediate medium. Moreover, the first feature "up", "above" and "on" the second feature may be that the first feature is directly above or obliquely above the second feature, or merely be that the first feature has a level higher than the second feature. The first feature "down", "below" and "under" the second feature may be that the first feature is directly below or obliquely below the second feature, or merely be that the first feature has a level less than the second feature.

Figure 2:
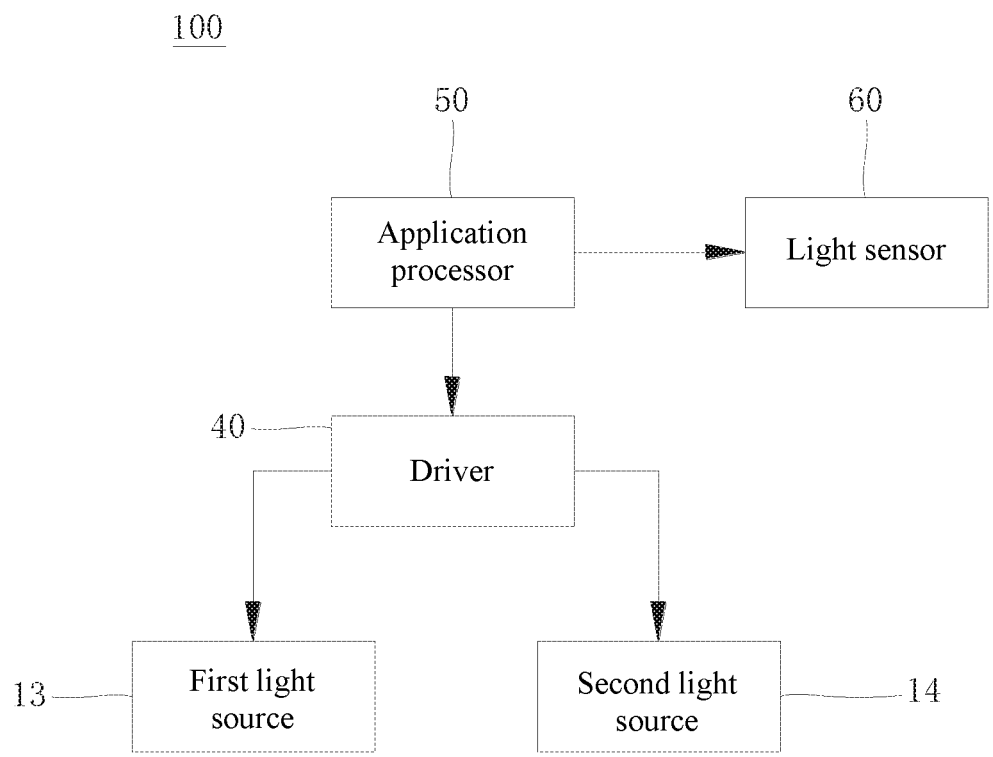
FIG. 2 is a block diagram of a terminal according to an embodiment of the present disclosure.
Figure 3:
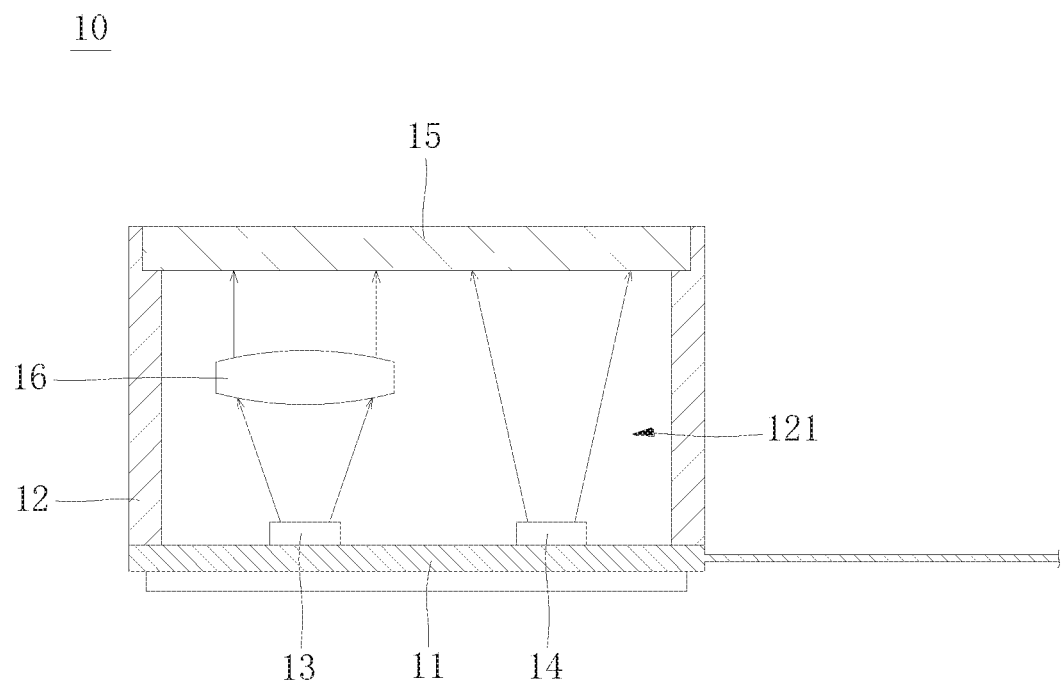
FIG. 3 is a schematic view of a projection module according to an embodiment of the present disclosure.

As illustrated in FIGS. 1-3, a terminal 100 according to an embodiment of the present disclosure includes a projection module 10 and a driver 40. The projection module 10 includes a base 11, a housing 12, a first light source 13, a second light source 14 and an optical element 15. The housing 12 is arranged on the base 11, and the housing 12 and the base 11 together enclose an accommodating cavity 121. The first light source 13 is arranged on the base 11 and received in the accommodating cavity 121. The second light source 14 is arranged on the base 11 and received in the accommodating cavity 121. The optical element 15 is arranged on the housing 12 and includes a diffraction area 151 and a diffusion area 152 (as further illustrated in FIGS. 6-7). The first light source 13 aligns with the diffraction area 151, and the second light source 14 aligns with the diffusion area 152. The diffraction area 151 is configured to diffract light passing through the diffraction area 151. The diffusion area 152 is configured to diffuse light passing through the diffusion area 152. The driver 40 is connected with the first light source 13 and the second light source 14, and is configured to drive the first light source 13 and the second light source 14 to emit light.

In the projection module 10 and the terminal 100 according to the embodiment of the present disclosure, the first light source 13 and the second light source 14 are arranged on the same base 11 together and encapsulated in the same housing 12. The light may be used for one purpose after passing through the diffraction area 151 and may be used for another purpose after passing through the diffusion area 152. Without the first light source 13 and the second light source 14 being encapsulated into different modules respectively, thus the integration level of the projection module 10 is improved and space required for mounting the projection module 10 in the terminal 100 is reduced.

In some embodiments, as illustrated in FIGS. 1 to 3, the terminal 100 includes a casing 30, a projection module 10, an infrared camera 20 and a driver 40. The terminal 100 may be a mobile phone, a tablet computer, a smart watch, a head-mounted display device, an AR glasses, a VR glasses, a game console, a notebook computer, etc. In the present disclosure, descriptions are made by taking the mobile phone as an example of the terminal 100, and it may be understood that a specific form of the terminal 100 is not limited to the mobile phone.

The casing 30 may be configured as a mounting carrier of functional elements of the terminal 100, and may provide the functional elements with protection against dust, water, drop, and so on. The functional elements may include the projection module 10, the infrared camera 20, the driver 40, an application processor 50, a light sensor 60, a visible light camera 70, a display screen 80, a main board, a power module and other elements of the terminal 100. The casing 30 may include a front surface 31 and a back surface 32 which faces away from the front surface 31, and the functional element may be mounted to the front surface 31 or the back surface 32. For example, in the embodiment illustrated in FIG. 1, the display screen 80 is mounted to the casing 30 and arranged on the front surface 31, the visible light camera 70 is mounted to the casing 30 and arranged on the back surface 32, and the projection module 10 and the infrared camera 20 are both mounted to the casing and arranged on the back surface 32. In this case, the visible light camera 70 may be configured as a rear camera, and the projection module 10 and the infrared camera 20 may be configured as a rear depth acquisition device together. The visible light camera 70 may include one or more of a telephoto camera, a wide-angle camera, a periscope camera, a black-and-white camera, etc., and the display screen 80 may be a liquid crystal display screen, an OLED display screen, a Micro LED display screen, etc.

In other embodiments, the mounting positions of the display screen 80, the visible light camera 70, the projection module 10 and the infrared camera 20 on the casing 30 may be arranged in another way. For example, the display screen 80 may be arranged on both the front surface 31 and the back surface 32 at the same time, the visible light camera 70 may also be arranged on the front surface 31 as the front camera, and the projection module 10 and the infrared camera 20 may also be mounted on the front surface 31 together as a front depth acquisition device. In addition, the visible light camera 70 may also be arranged below the display screen 80. That is, the visible light camera 70 receives the light passing through the display screen 80 for imaging. The projection module 10 and the infrared camera 20 may also be arranged below the display screen 80, the light emitted from the projection module 10 enters the outside of the terminal 100 after passing through the display screen 80, and the infrared camera 20 receives the light passing through the display screen 80 from the outside of the terminal 100 to acquire the depth.

As illustrated in FIG. 1 and FIG. 3, the projection module 10 is mounted to the casing 30. In the present disclosure, descriptions are made by taking an example that the projection module 10 is exposed from the back surface 32 of the casing 30 and the infrared camera 20 is exposed from the back surface 32 of the casing 30. The projection module 10 and the infrared camera 20 may acquire the depth by using structured light ranging or time of flight (TOF) ranging. In the embodiment of the present disclosure, descriptions are made by taking an example that the projection module 10 and the infrared camera 20 acquire the depth by using the structured light ranging.

As illustrated in FIG. 3, the projection module 10 may be configured to project light to a target object, and the light may be an infrared laser. In a usage state, the projection module 10 may be configured to project uniform flood light to the target object, and in another usage state, the projection module 10 may be configured to project light with a specific pattern to the target object. The pattern may be a speckle pattern, a stripe pattern, etc. The projection module 10 includes a base 11, a housing 12, a first light source 13, a second light source 14 and an optical element 15.

The base 11 may include a circuit board and a reinforcing plate. The circuit board may be any one of a printed circuit board, a flexible circuit board and a flex-rigid print circuit board. A part of the circuit board is covered by the housing 12, and another part thereof extends out and may be connected to a connector. For example, the connector may be a BTB (board to board) connector, and may connect the projection module 10 to the main board of the terminal 100. The reinforcing plate may be combined with the circuit board to enforce an overall strength of the base 11, and the reinforcing plate may be made of materials such as a steel plate.

As illustrated in FIG. 3, the housing 12 is arranged on the base 11, and the housing 12 and the base 11 together enclose the accommodating cavity 121. The housing 12 may have a hollow cylindric shape as a whole, and a side wall of the housing 12 encloses the accommodating cavity 121. The housing 12 may be connected with the circuit board of the base 11. The housing 12 may be adhered to the circuit board by a glue to improve the airtightness of the accommodating cavity 121. The accommodating cavity 121 may be configured to accommodate the first light source 13, the second light source 14 or the like, and also, the accommodating cavity 121 serves as a part of a light path of the projection module 10.

Figure 4A:
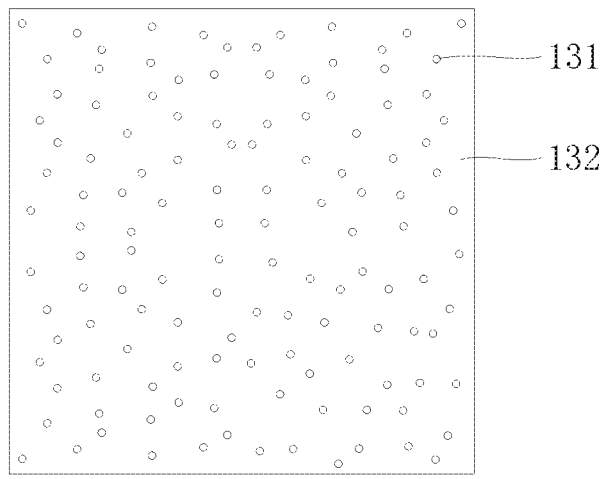
FIGS. 4A and 4B are schematic views of a first light source according to an embodiment of the present disclosure.
Figure 4B:
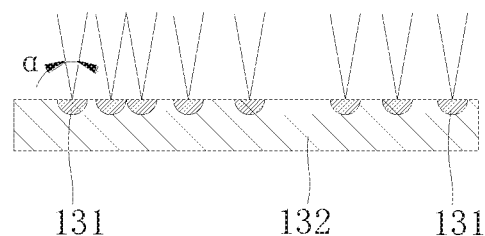

As illustrated in FIG. 3 and FIGS. 4A-4B, the first light source 13 may be configured to emit light which may be an infrared laser, and the first light source 13 may be configured as a light source of the projection module 10 for emitting light with a specific pattern. The first light source 13 is arranged on the base 11 and received in the accommodating cavity 121. In some embodiments, the first light source 13 may be a vertical cavity surface emitting laser (VCSEL). The first light source 13 may be arranged on and connected with the circuit board. In the embodiment of the present disclosure, the first light source 13 includes a first substrate 132 and a plurality of first light-emitting units 131 arranged on the first substrate 132. Each first light-emitting unit 131 may be independently controlled. For example, the first light-emitting unit 131 is controlled to emit light or not independently, and a light emission power of the first light-emitting unit 131 is controlled independently. The plurality of first light-emitting units 131 may be irregularly arranged on the first substrate 132 to improve the irrelevance of the specific pattern. In an embodiment, the plurality of first light-emitting units 131 may be divided into a plurality of groups, the first light-emitting units 131 in the same group may emit light at the same time, and the first light-emitting units 131 in different groups may have different light-emitting states. For example, when a distance to the target object is relatively close, it is possible to control one group of the first light-emitting units 131 to emit light and the other groups of the first light-emitting units 131 not to emit light, and when the distance to the target object is relatively far, it is possible to control all the groups of the first light-emitting units 131 to emit light so as to increase the energy of the laser irradiating the target object.

Figure 5A:
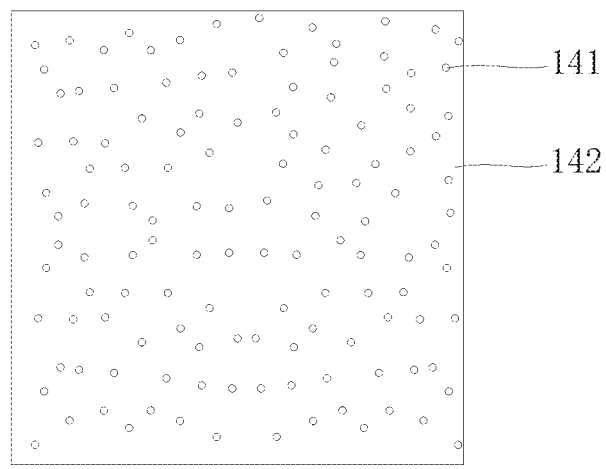
FIGS. 5A and 5B are schematic views of a second light source according to an embodiment of the present disclosure.
Figure 5B:
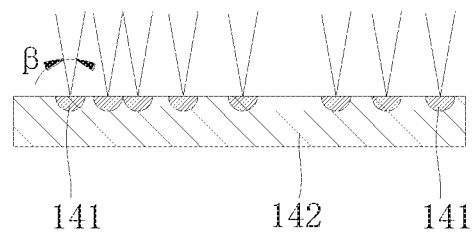

As illustrated in FIG. 3 and FIGS. 5A-5B, the second light source 14 may be configured to emit light which may also be an infrared laser, and the second light source 14 may be configured as a light source of the projection module 10 for projecting flood light. The second light source 14 is arranged on the base 11 and received in the accommodating cavity 121. In some embodiments, the second light source 14 may be a vertical cavity surface emitting laser (VCSEL). The second light source 14 may be arranged on and connected with the circuit board. In the embodiment of the present disclosure, the second light source 14 includes a second substrate 142 and a plurality of second light-emitting units 141 arranged on the second substrate 142. Each second light-emitting unit 141 may be independently controlled. For example, the second light-emitting unit 141 may be controlled to emit light or not independently, and a light emission power of the second light-emitting unit 141 may be controlled independently.

Figure 6:
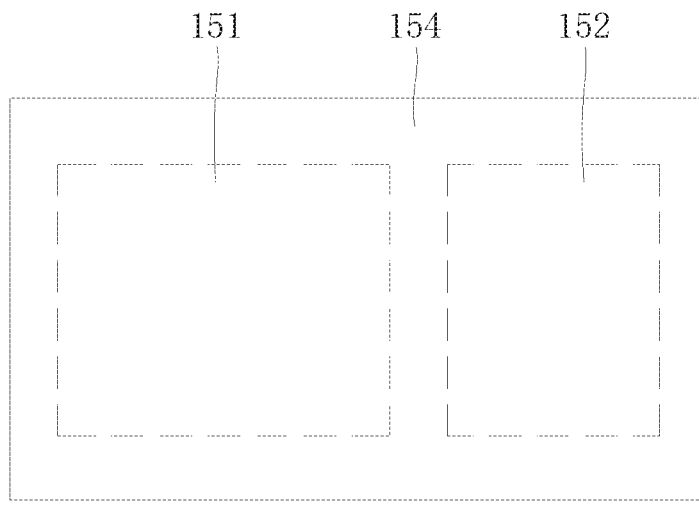
FIG. 6 and FIG. 7 are schematic views of an optical element according to an embodiment of the present disclosure.
Figure 7:
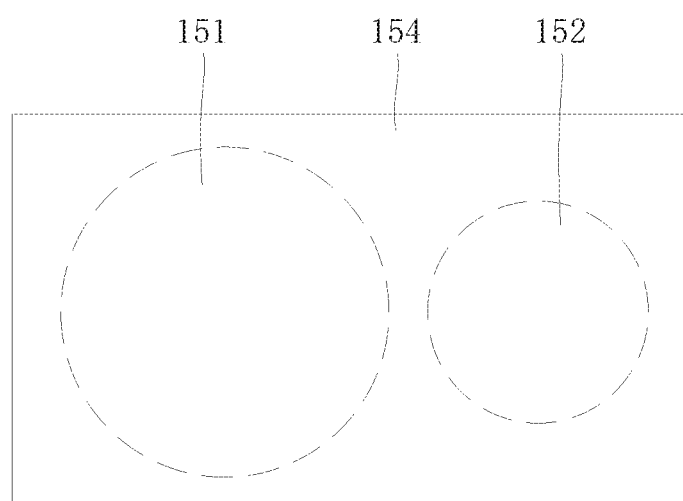

As illustrated in FIG. 3, FIG. 6 and FIG. 7, the optical element 15 is mounted on the housing 12 and arranged in light emitting paths of the first light source 13 and the second light source 14. In some embodiments, the optical element 15 is mounted on the housing 12 and covers the accommodating cavity 121, such that the light emitted from the first light source 13 and the second light source 14 cannot be emitted to outside until passing through the optical element 15. The optical element 15 includes the diffraction area 151 and the diffusion area 152.

Figure 8A:
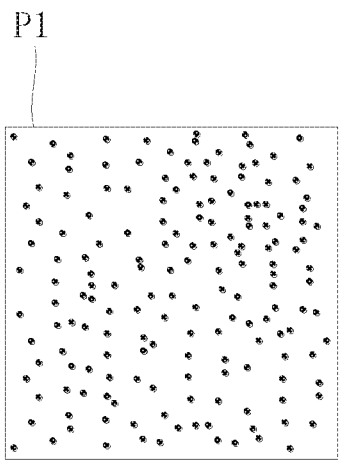
FIGS. 8A and 8B are schematic views illustrating patterns of light projected from a projection module according to an embodiment of the present disclosure.

The first light source 13 aligns with the diffraction area 151, and particularly, an optical axis of a light beam emitted from the first light source 13 passes through a center of the diffraction area 151. Since the first light source 13 aligns with the diffraction area 151, all the light emitted from the first light source 13 mostly passes through the diffraction area 151, and all the light passing through the diffraction area 151 also mostly comes from the first light source 13. The light emitted from the first light source 13 enters the outside after passing through the diffraction area 151. The diffraction area 151 is provided with a diffraction structure. When the light emitted from the first light source 13 passes through the diffraction area 151, the light is diffracted by the diffraction area 151 and further emitted to the outside after forming a specific pattern. In this case, a diffraction effect of the diffraction area 151 on the light is equivalent to an effect of a diffractive optical element (DOE) on the light. In an embodiment, the specific pattern is illustrated as a pattern P1 in FIG. 8A, dots with shadows represent positions where laser spots are, and the rest are not irradiated by the laser. In an embodiment, a collimation piece 16 may also be arranged between the first light source 13 and the diffraction area 151. The collimation piece 16 may be an optical lens, and can collimate the light passing through the collimation piece 16. For example, the collimation piece 16 can collimate the light emitted from the first light source 13, and the collimated light can irradiate the diffraction area 151 concentratedly, thus resulting in a low energy loss.

The second light source 14 aligns with the diffusion area 152, and particularly, an optical axis of a light beam emitted from the second light source 14 passes through a center of the diffusion area 152. Since the second light source 14 aligns with the diffusion area 152, all the light emitted from the second light source 14 mostly passes through the diffusion area 152, and all the light passing through the diffusion area 152 also mostly comes from the second light source 14.

Figure 8B:
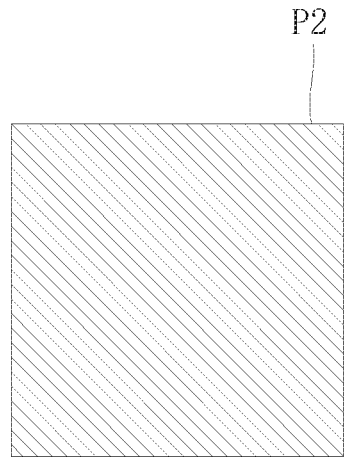

The light emitted from the second light source 14 enters the outside after passing through the diffusion area 152. The light emitted from the second light source 14 is diffused into a surface light source and is uniformly emitted to the outside after passing though the diffusion area 152. In this case, a diffusion effect of the diffusion area 152 on the light is equivalent to an effect of a diffuser on the light. In an embodiment, after the surface light source is emitted to the outside, a projection is formed and has a shape of a pattern P2 illustrated in FIG. 8B, in which a shadow part represents an area that is irradiated by the light and light intensities at different positions in the shadow part are substantially the same.

The diffractive area 151 and the diffusion area 152 may be spaced apart from each other or joint with each other. The diffraction area 151 may aligns with the first light source 13, and the diffusion area 152 may aligns with the second light source 14. Shapes of the diffraction area 151 and the diffusion area 152 may be the same or different. An area of the diffraction area 151 may be larger than an area of the diffusion area 152, or the area of the diffraction area 151 may be smaller than or equal to the area of the diffusion area 152. In an embodiment illustrated in FIG. 6, the shapes of the diffraction area 151 and the diffusion area 152 are rectangular, and in an embodiment illustrated in FIG. 7, the shapes of the diffraction area 151 and the diffusion area 152 are circular. In addition, the optical element 15 may further include a mounting area 154. A part of the mounting area 154 is arranged adjacent to an edge of the optical element 15, and another part of the mounting area 154 is arranged between the diffraction area 151 and the diffusion area 152. The mounting area 154 may not be provided with a microstructure to save a manufacturing cost of the optical elements 15. The mounting area 154 may be configured to be mounted to and fitted with the housing 12. For example, the mounting area 154 abuts against the housing 12 and is adhered to the housing 12.

As illustrated in FIG. 1, the infrared camera 20 may be configured to collect the light that is projected from the projection module 10 to the target object and then is reflected by the target object. For example, in a usage state, when the projection module 10 projects the uniform flood light to the target object, the infrared camera 20 collects the flood light reflected by the target object for generating a two-dimensional image of the target object. In another usage state, when the projection module 10 projects the laser with the specific pattern to the target object, the laser is reflected by the target object, and then the infrared camera 20 receives the reflected laser to acquire the reflected laser pattern for generating the three-dimensional depth information of the target object. It may be understood that, the reflected laser pattern is related to the depth information of the target object and actually contains the depth information of the target object.

When the projection module 10 and the infrared camera 20 are used, the projection module 10 may be first used to project the uniform flood light, and the infrared camera 20 collects the reflected flood light to generate a two-dimensional image. Then, the projection module 10 is used to project the laser with the specific pattern, and the infrared camera 20 collects the reflected laser pattern to generate the depth information. The two-dimensional image and the depth information may be used to verify a current user's body. When the two-dimensional image and the depth information both match with a pre-stored verification module, the verification passes. In a practical use, if an infrared light intensity in an environment can already meet the requirements for an imaging quality of the two-dimensional image, the infrared camera 20 can also directly collect the infrared light in the scene to generate the two-dimensional image without the flood light being projected.

As illustrated in FIGS. 1 to 3, the driver 40 is connected with the first light source 13 and the second light source 14, and the driver 40 is configured to drive the first light source 13 and the second light source 14 to emit light. In some embodiments, the driver 40 may be an independent drive chip, a specific driving circuit is encapsulated in the driver 40, and the driver 40 may be arranged on the base 11 or on the main board of the terminal 100. The driver 40 is connected with both of the first light source 13 and the second light source 14. The driver 40 may be configured to control the first light source 13 to emit light separately, to control the second light source 14 to emit light separately, or to control the first light source 13 and the second light source 14 to emit light simultaneously, such that one driver 40 can take the lighting control of the first light source 13 and the second light source 14 into consideration at the same time, without the need for two dependent driving circuits provided for the first light source 13 and the second light source 14, and thus the additional synchronous signal circuits for the two independent driving circuits, thereby simplifying a circuit structure.

The driver 40 is also connected to an application processor 50 (AP) of the terminal 100. The application processor 50 may be configured to send instructions to the driver 40, and the driver 40 responds to the instructions to control the first light source 13 and/or the second light source 14 to emit light. In an embodiment, the application processor 50 may be configured to send an instruction to the driver 40 to separately control the second light source 14 to emit light when an ambient light intensity is less than a preset intensity threshold, and the driver 40 responds to the instruction and controls the second light source 14 to emit light separately.

It may be understood that if the infrared light intensity in the environment is weak, when the infrared camera 20 collects the infrared light to generate the two-dimensional image, the quality of the generated image is poor, and thus usage requirements for scenes such as authentication cannot be satisfied. Therefore, when the infrared light intensity is weak, the second light source 14 may be controlled to emit light, such that the projection module 10 may project an infrared flood light to the scene to complement the amount of the infrared light in the scene. The ambient light intensity may be an intensity of visible light. When the intensity of visible light is less than the intensity threshold, an intensity of infrared light in the scene is also is considered to be weak. The ambient light intensity may also be the intensity of infrared light detected directly. It is determined whether the infrared light is weak by directly comparing the intensity of infrared light with the intensity threshold.

In another embodiment, after the infrared camera 20 collects the two-dimensional image or whenever the depth information needs to be acquired, the application processor 50 may send an instruction to the driver 40 to separately control the first light source 13 to emit light. The driver 40 responds to the instruction and controls the first light source 13 to emit light separately, such that the projection module 10 projects the laser with the specific pattern into the scene. The infrared camera 20 receives the reflected laser to acquire the reflected laser pattern which is used for subsequent processing to acquire the depth information of a target scene.

In summary, in the projection module 10 and the terminal 100 according to the embodiment of the present disclosure, the first light source 13 and the second light source 14 are disposed on the same base 11 together and encapsulated in the same housing 12. The light may be used for a purpose after passing through the diffraction area 151 and may be used for another purpose after passing through the diffusion area 152, without the first light source 13 and the second light source 14 being encapsulated into different modules respectively, thus improving the integration level of the projection module 10 and reducing space required for mounting the projection module 10 in the terminal 100.

As illustrated in FIG. 3 and FIG. 4, in some embodiments, a divergence angle α of each first light-emitting unit 131 is less than 20 degrees. For example, the divergence angle of each first light-emitting unit 131 may have any value less than 20 degrees, such as 19 degrees, 15 degrees, 11.5 degrees, 10 degrees, 7 degrees, 5 degrees, 3 degrees, etc. When the divergence angle of the first light-emitting unit 131 is less than 20 degrees, the divergence angle of the projected laser after the laser is diffracted by the diffraction area 151 of the optical element 15 will not be too large. Even if the distance to the target object is far, an irradiation range of the laser will not be too wide, so that a density of the energy irradiating the target object will not be too small, and thus is not easy to be disturbed by the external light. The divergence angles of different first light-emitting unit 131 may be different. For example, a range of the divergence angles of a first part of the first light-emitting units 131 is a first range, a range of the divergence angles of a second part of the first light-emitting units 131 is a second range, a range of the divergence angles of a third part of the first light-emitting units 131 is a third range, . . . and a range of the divergence angles of a nth part of the first light-emitting units 131 is a nth range. The first range, the second range, the third range . . . the nth range may be different and all less than 20 degrees. When the distance to the target object is relatively close, the first light-emitting unit 131 having a large divergence angle is controlled to emit light, such that the laser energy is relatively divergent to avoid hurting a user. When the distance to the target object is relatively far, the first light-emitting unit 131 having a small divergence angle is controlled to emit light, such that the energy density of the laser projected to the target object is relatively high, so as not to be easily disturbed.

Furthermore, since the energy density of the laser projected to the target object from the projection module 1010 is relatively high and not easy to be disturbed (e.g., by the infrared light in the environment), a signal-to-noise ratio of the laser pattern collected by the infrared camera 2020 is relatively high, thus facilitating to acquire accurate depth information later.

Figure 9:
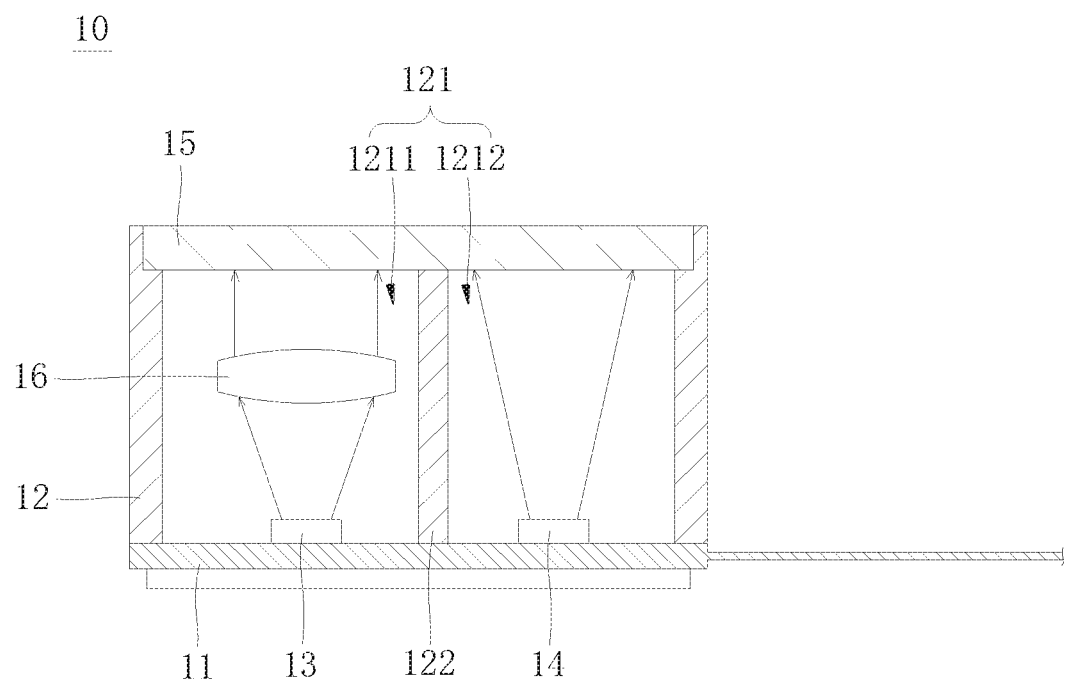
FIG. 9 is a schematic view of a projection module according to an embodiment of the present disclosure.

As illustrated in FIG. 6 and FIG. 9, in some embodiments, the projection module 10 further includes a spacer 122 configured to divide the accommodating cavity 121 into a first cavity 1211 and a second cavity 1212. The first light source 13 is arranged in the first cavity 1211, and the second light source 14 is arranged in the second cavity 1212.

The first light source 13 and the second light source 14 are respectively arranged in two cavities spaced apart from each other, so as to avoid an interference between the light emitted from the first light source 13 and the light emitted from the second light source 14. In some embodiments, the spacer 122 may be made of light-proof materials, such as light absorbing materials or reflective materials. One end of the spacer 122 may abut against the base 11, and the other end thereof may abut against the optical element 15. The diffraction area 151 and the diffusion area 152 are arranged on both sides of the spacer 122, respectively. The light emitted from the first light source 13 enters the first cavity 1211 and then passes through the diffraction area 151 to enter the outside, but cannot pass through the spacer 122 to enter the second cavity 1212 or pass through the diffusion area 152. The light emitted from the second light source 14 enters the second cavity 1212 and passes through the diffusion area 152 to enter the outside, but cannot pass through the spacer 122 to enter the first cavity 1211 or pass through the diffraction area 151. The spacer 122 and the housing 12 may be manufactured by an integrated molding process, and the spacer 122 and the housing 12 may be molded respectively, and then mounted together.

Figure 10A:
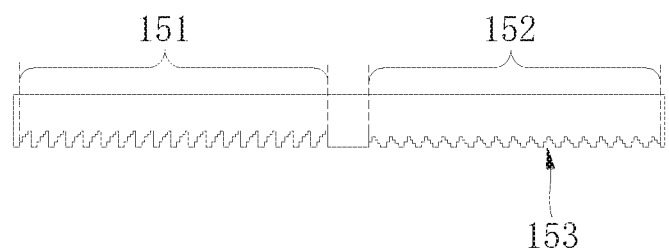
FIG. 10A is a schematic view of an optical element in a first form according to an embodiment of the present disclosure.
Figure 10B:
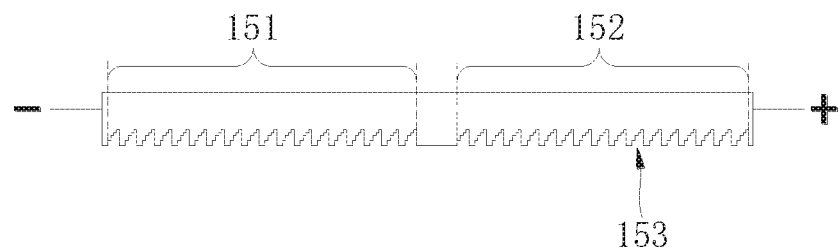
FIG. 10B is a schematic view of an optical element in a second form according to an embodiment of the present disclosure.

As illustrated in FIG. 3 and FIGS. 10A-10B, in some embodiments, the optical element 15 includes a variable microstructure 153 arranged at the diffusion area 152. When an electric field is not applied, the variable microstructure 153 is in a first form, and when the electric field is applied, the variable microstructure 153 is deformed and is in a second form.

In some embodiments, at least part of the variable microstructure 153 may be made of electrostrictive materials, piezoelectric materials, etc. Under the action of the electric field, this part of the variable structure 153 will deform, and then change an overall structure of the variable microstructure 153. It may be understood that the change of the variable microstructure 153 causes a change of its effect on light. As illustrated in FIG. 10A, when the electric field is not applied, the variable microstructure 153 is in the first form, and the diffusion area 152 may have an effect on the light. As illustrated in FIG. 10B, when the electric field is applied, the variable microstructure 153 is deformed and is in the second form, and the diffusion area 152 may have another effect on the light. Therefore, by changing the effect of the diffusion area 152 on the light, the projection module 10 is able to project at least two different kinds of light when the second light source 14 emits light separately.

Figure 11A:
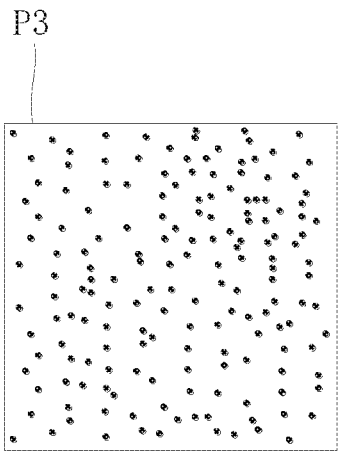
FIGS. 11A, 11B and 11C are schematic views illustrating patterns of light projected from a projection module according to an embodiment of the present disclosure.
Figure 11B:
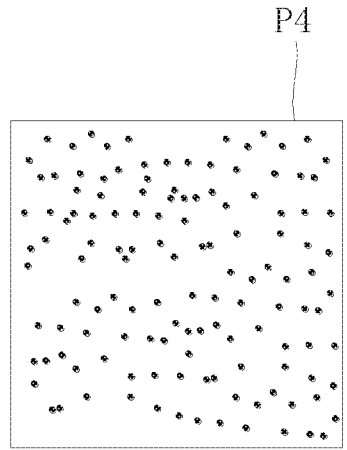
Figure 11C:
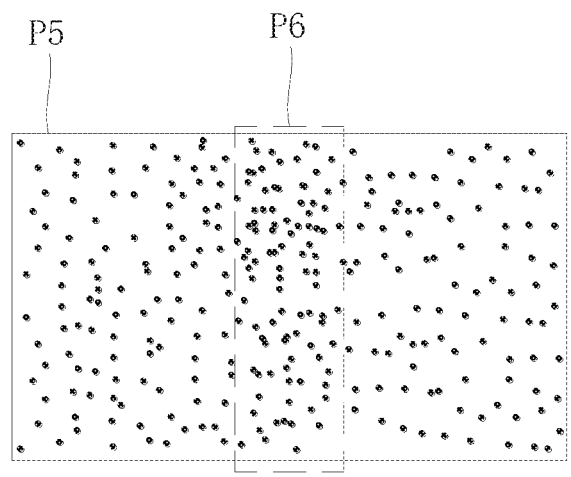

In an embodiment, when the variable microstructure 153 is in the first form, the light emitted from the second light source 14 passes through the diffusion area 152 to form the surface light source (e.g. the above flood light). When the variable microstructure 153 is in the second form, the light emitted from the second light source 14 passes through the diffusion area 152 to form a structured light. When the first light source 13 emits light separately, the pattern of the light projected by the projection module 10 is illustrated as a pattern P3 in FIG. 11A. When the second light source 14 emits light separately, and the variable microstructure 153 is in the second form, the pattern of the light projected by the projection module 10 is illustrated as a pattern P4 in FIG. 11B. When the first light source 13 and the second light source 14 emit light together, and the variable microstructure 153 is in the second form, the pattern of the light projected by the projection module 10 is illustrated as a pattern P5 in FIG. 11C. The pattern P5 may be acquired by superposing the pattern P3 and the pattern P4, and a superposed part of the pattern P3 and the pattern P4 is illustrated as P6 in FIG. 11C. In this way, the projection module 10 can project at least three different structured light patterns (such as the patterns P3, P4 and P5). The user may choose which pattern to project according to different requirements. For example, when the depth information of the scene having a large range needs to be acquired, the projection module 10 may be controlled to project the pattern P5, such that the laser pattern covers a large range.

Accordingly, when the variable microstructure 153 is in the first form, the second light source 14 emits light at a first power, and when the variable microstructure 153 is in the second form, the second light source 14 emits light at a second power. The second power is greater than the first power. The working power of the second light source 14 may be controlled by the driver 40. When the second light source 14 is used in different scenes, the second light source 14 is controlled to emit light at different working power, such that the projection module 10 can adapt to different scene requirements.

As illustrated in FIG. 3 and FIGS. 5A-5B, in some embodiments, a divergence angle β of each second light-emitting unit 141 is less than 7 degrees. In this case, the light emitted from the second light-emitting unit 141 directly reaches the diffusion area 152. The divergence angle of each second light-emitting unit 141 may have any value less than 7 degrees, such as 6 degrees, 5 degrees, 3 degrees, etc. Thus, even if the light emitted from the second light source 14 is used to form a structured light finally, it may be not necessary to arrange a collimation element between the second light source 14 and the diffusion area 152, thereby reducing the structural complexity of the projection module 10.

Figure 12:
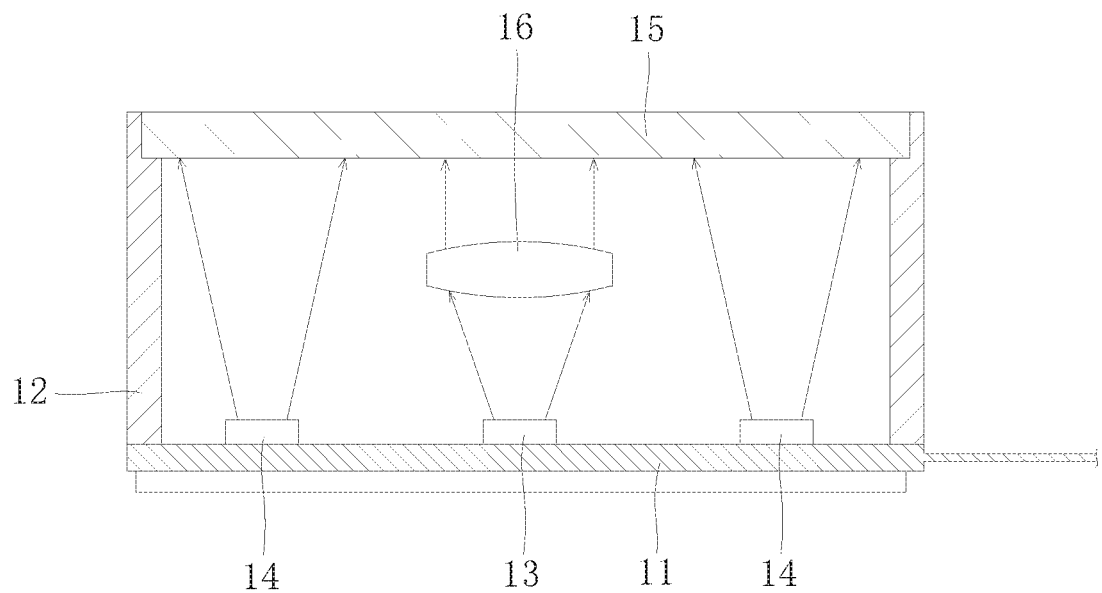
FIG. 12 is a schematic view of a projection module according to an embodiment of the present disclosure.
Figure 13:
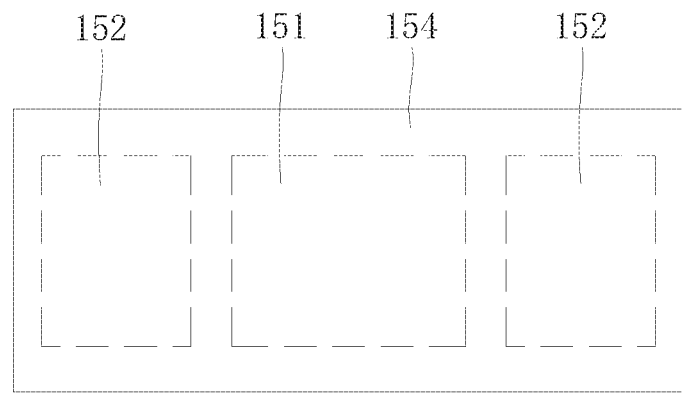
FIG. 13 is a schematic view of an optical element according to an embodiment of the present disclosure.

As illustrated in FIG. 12 and FIG. 13, in some embodiments, the number of the second light sources 14 is two, and each of the two second light sources 14 is correspondingly arranged on a first side or a second side of the first light source 13. The number of the diffusion areas 152 is two, and each of the two diffusion areas 152 is correspondingly arranged on a first side or a second side of the diffraction area 151, and are correspond to the two second light sources 14 one to one. The two second light sources 14 may be controlled to emit light simultaneously or separately, and the two diffusion areas 152 may also include the above variable microstructure 153. When the two second light sources 14 are adopted and emit light simultaneously, the light emitted from the two second light sources is projected into the scene under the respective actions of the two diffusion areas 152, thereby increasing the coverage of the light emitted from the projection module 10.

As illustrated in FIG. 2, in some embodiments, the terminal 100 further includes an ambient light sensor (ALS) 60 for detecting the ambient light intensity. The light sensor 60 is controlled by the application processor 50 to detect the ambient light intensity. The application processor 50 compares the detected ambient light intensity with the intensity threshold, and sends different control instructions to the driver 40 according to the comparison results.

Figure 14:
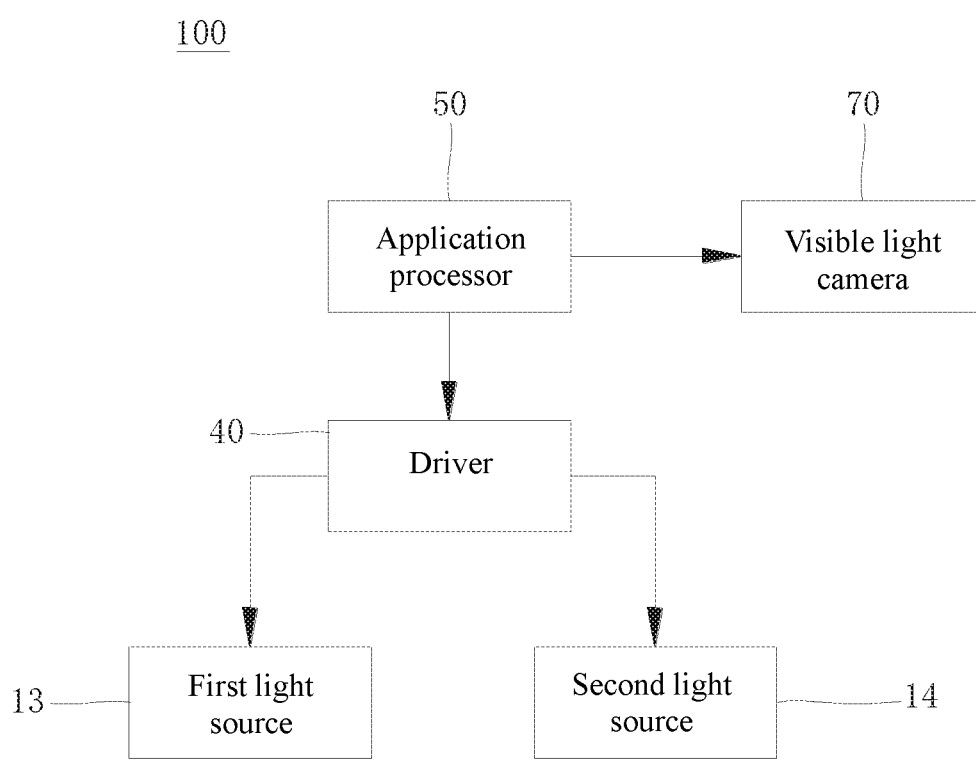
FIG. 14 and FIG. 15 are block diagrams of a terminal according to an embodiment of the present disclosure.

As illustrated in FIG. 14, in some embodiments, the visible light camera 70 is configured to collect a visible light image, and the application processor 50 is configured to calculate the ambient light intensity based on the visible light image. In some embodiments, the visible light camera 70 collects the visible light image, and pixel values of a plurality of pixels in the visible light image may be acquired by the application processor 50. The application processor 50 calculates the ambient light intensity based on the pixel values. For example, an average value of the pixel values is taken as the ambient light intensity. The application processor 50 further compares the detected ambient light intensity with the intensity threshold, and sends the different control instructions to the driver 40 according to the comparison results.

Figure 15:
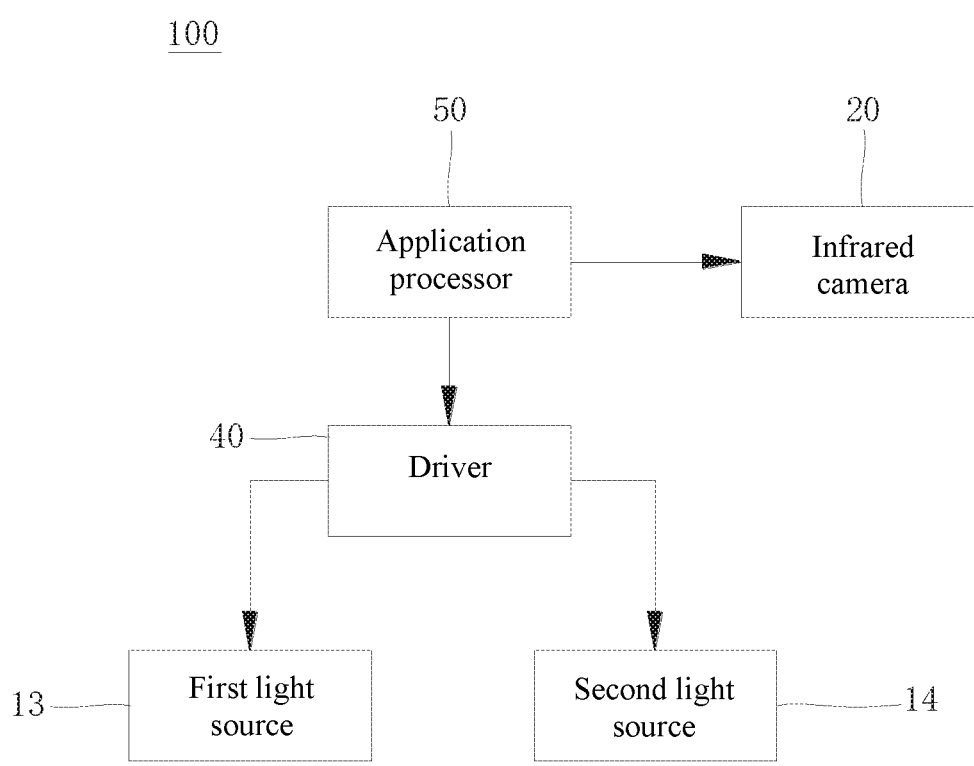

As illustrated in FIG. 15, in some embodiments, the infrared camera 20 is configured to collect an infrared image, and the application processor 50 is configured to calculate the ambient light intensity based on the infrared image. In some embodiments, the infrared camera 20 collects the infrared image. Pixel values of a plurality of pixels in the infrared image may be acquired by the application processor 50, and the application processor 50 calculates the ambient light intensity based on the pixel values. For example, an average value of the pixel values is taken as the ambient light intensity. The application processor 50 further compares the detected ambient light intensity and the intensity threshold, and sends the different control instructions to the driver 40 according to the comparison results.

Figure 16:
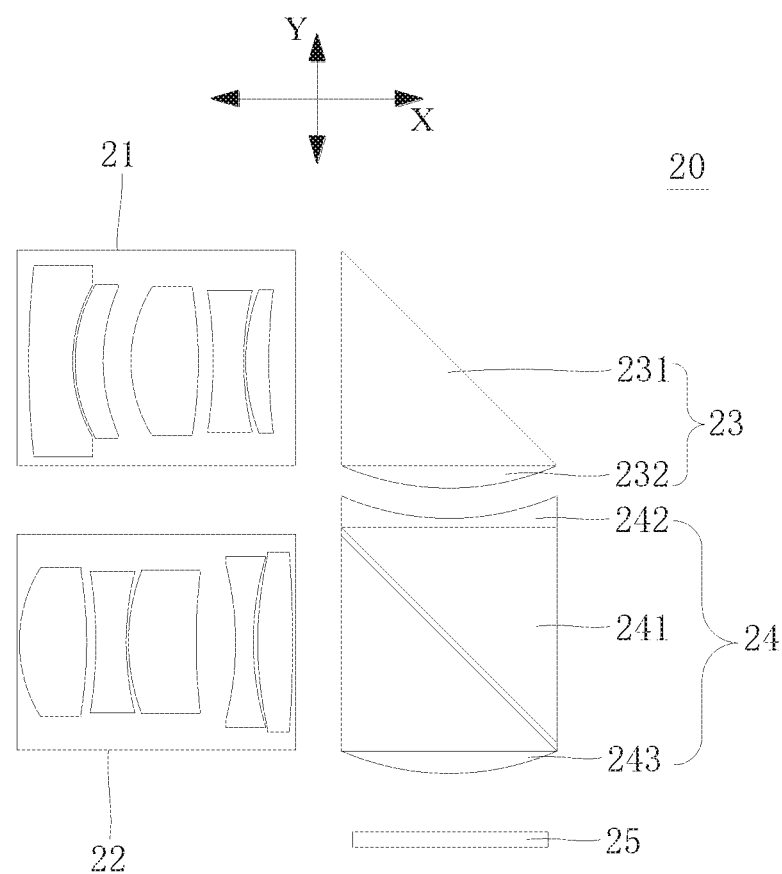
FIG. 16 is a schematic view of an infrared camera according to an embodiment of the present disclosure.
Figure 17:
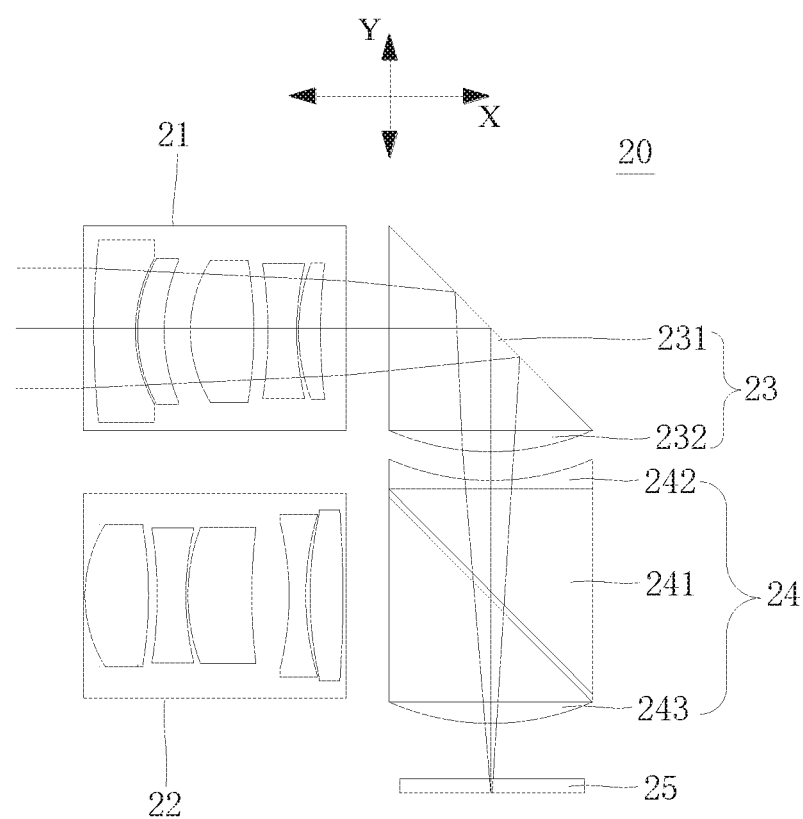
FIG. 17 is a schematic view illustrating a first light path in which an infrared camera collects a laser pattern according to an embodiment of the present disclosure.
Figure 18:
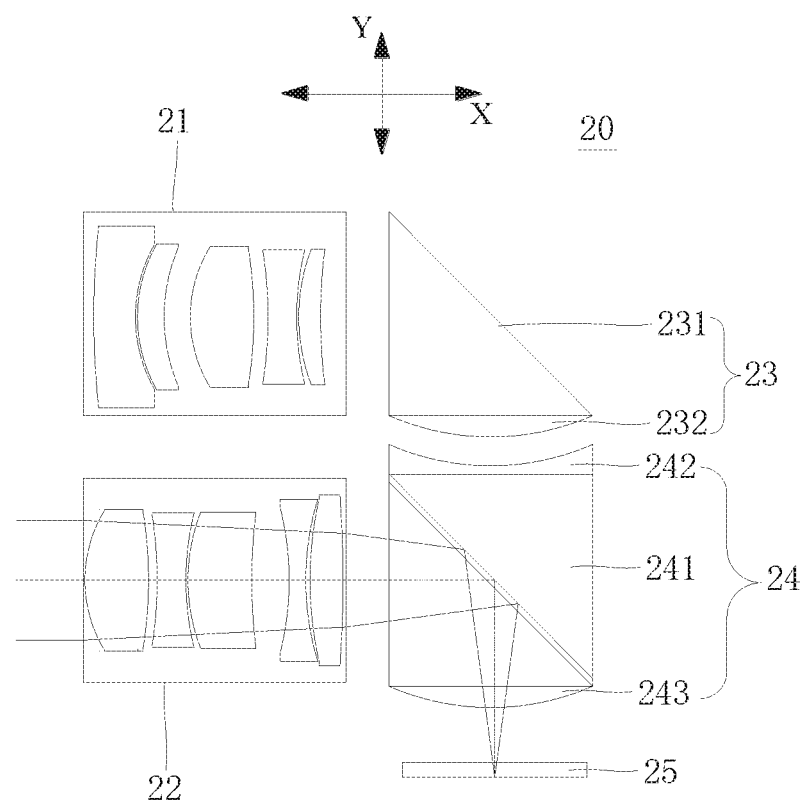
FIG. 18 is a schematic view illustrating a second light path in which an infrared camera collects a laser pattern according to an embodiment of the present disclosure.

As illustrated in FIGS. 16 to 18, in some embodiments, the infrared camera 20 includes a first lens group 21, a second lens group 22, a reflective prism 23, a transflective prism 24, and a photosensitive piece 25. An optical axis of the first lens group 21 and an optical axis of the second lens group 22 are both oriented in a first direction (X direction illustrated in FIGS. 16 to 18) and parallel to each other. The transflective prism 24 may switch between a transmission mode and a reflection mode.

In an embodiment illustrated in FIG. 17, when the transflective prism 24 is in the transmission mode, a light path that the light entering from the first lens group 21 is reflected to a second direction (Y direction illustrated in FIGS. 16 to 18) by the reflective prism 23 and then transmitted through the transflective prism 24 serves as a first light path, and the light passing through the first lens group 21, the reflective prism 23 and the transflective prism 24 via the first light path reaches the photosensitive piece 25. In an embodiment illustrated in FIG. 18, when the transflective prism 24 is in the reflection mode, a light path that the light entering from the second lens group 22 is reflected to the second direction by the transflective prism 24 serves as a second light path, and the light passing through the second lens group 22 and the transflective prism 24 via the second light path reaches the photosensitive piece 25. The second direction may be different from the first direction. In an embodiment, the second direction is perpendicular to the first direction.

The reflective prism 23 includes a reflective prism body 231 and a first attached lens 232. One or more first attached lenses 232 may be provided. The first attached lens 232 may be adhered to or integrated with the reflective prism body 231. The transflective prism 24 includes a transflective prism body 241, a first additional lens 242 and a second additional lens 243. One or more first additional lenses 242 and second additional lenses 243 may be provided. The first additional lens 242 and the second additional lens 243 may be bonded to the transflective prism body 241, or may be integrated with the transflective prism body 241.

As illustrated in FIG. 16 and FIG. 17, the first lens group 21, the reflective prism body 231, the first attached lens 232, the first additional lens 242, the transflective prism body 241 and the second additional lens 243 are configured as a lens combination of the first light path and have a first focal length. As illustrated in FIG. 16 and FIG. 18, the second lens group 22, the transflective prism body 241 and the second additional lens 243 are configured as a lens combination of the second light path and have a second focal length. The first focal length and the second focal length are different. When in use, the first lens group 21 and the second lens group 22 may be provided with a light-shield sheet (not illustrated). When the first focal length is needed to focus, the light-shield sheet is driven to shield the second lens group 22, such that the light enters the infrared camera 20 from the first lens group 21. When the second focal length is needed to focus, the light-shield sheet is driven to shield the first lens group 21, such that the light enters the infrared camera 20 from the second lens group 22. In this way, the user may switch a focal length of the infrared camera 20 according to the distance to the target object, so as to acquire a clear laser pattern in many scenes.

Figure 19:
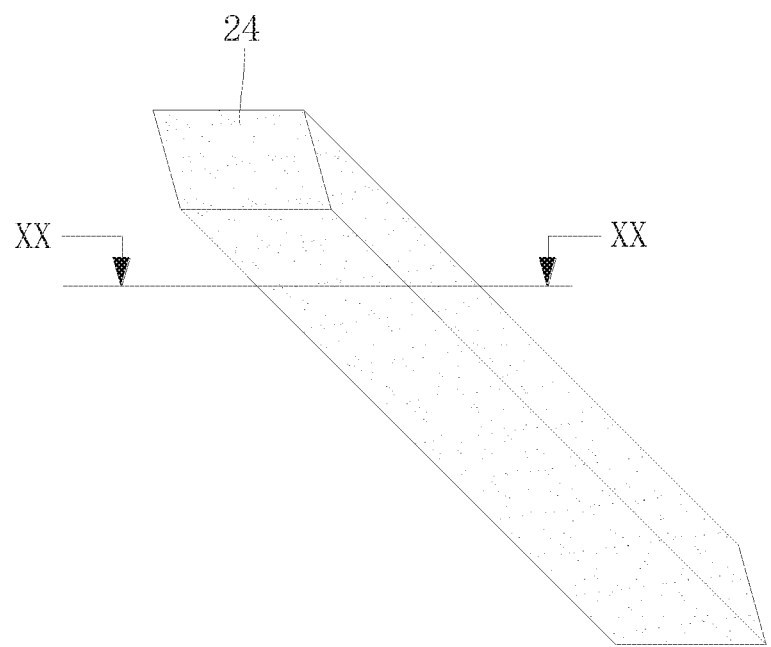
FIG. 19 is a schematic view of a transflective prism according to an embodiment of the present disclosure.
Figure 20:
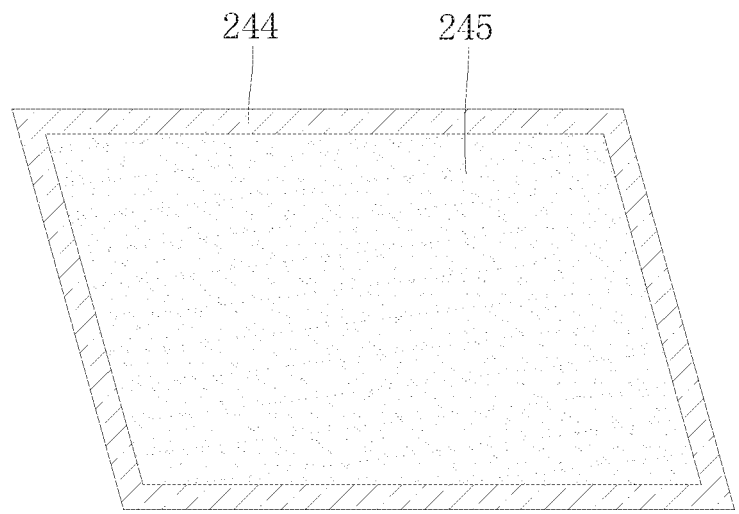
FIG. 20 is a sectional view of the transflective prism taken along a line XX-XX in FIG. 19.

As illustrated in FIG. 19 and FIG. 20, in some embodiments, the transflective prism 24 includes a light-transparent container 244 and a liquid crystal material layer 245 provided in the light-transparent container 244. The liquid crystal material layer 245 can switch the transflective prism 24 between the reflection mode and the transmission mode under the action of an electrical signal. The liquid crystal material layer 245 may adopt nematic liquid crystal materials or cholesterol liquid crystal material. In some embodiments, the liquid crystal material layer 245 is in a reflection state when the electrical signal is not provided. That is, in the case of power off, the transflective prism 24 is in the reflection mode. When the electrical signal is input, the liquid crystal material layer 245 is in a transmission state. That is, in the case of power on, the transflective prism 24 is in the transmission mode. The electrical signal herein may be a current signal or a voltage signal.

In an embodiment, the liquid crystal material layer 245 adopts the cholesterol liquid crystal materials which are composed of a chiral dopant and a nematic liquid crystal. With the presence of the chiral dopant, when the transflective prism 24 is in the reflection mode, a molecule of the nematic liquid crystal is elongated along a longitudinal molecular axis to form a spiral arrangement. When the transflective prism 24 is in the transmission mode, the molecules of the nematic liquid crystal are not arranged and in a scatter state, and thus the cholesterol liquid crystal material layer 245 becomes light transparent. The molecular scattering or the molecular arrangement allow the cholesterol liquid crystal material layer 245 to switch between the reflection state and the transmission state.

Reference throughout this specification to "certain embodiment", "an embodiments", "some embodiments", "an example embodiment", "an example", "a specific example", or "some examples" means that a particular feature, structure, material, or characteristic described in connection with the embodiment or example is included in at least one embodiment or example of the present application. In this specification, example descriptions of aforesaid terms are not necessarily referring to the same embodiment or example. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

Although embodiments of present application have been illustrated and described above, it should be understood by those skilled in the art that above embodiments are just explanatory, and cannot be construed to limit the present application, changes, modifications, alternatives and variations can be made to the embodiments without departing from the scope of the present application.

What is claimed is:

1. A projection module, comprising:
 a base;
 a housing disposed on the base and defining an accommodating cavity together with the base;
 a first light source disposed on the base and arranged in the accommodating cavity;
 a second light source disposed on the base and arranged in the accommodating cavity; and
 an optical element disposed on the housing and comprising a diffraction area and a diffusion area, the first light source aligning with the diffraction area, the second light source aligning with the diffusion area, the diffraction area being configured to diffract light passing through the diffraction area, and the diffusion area being configured to diffuse light passing through the diffusion area,
 wherein the optical element comprises a variable microstructure arranged at the diffusion area,
 wherein the variable microstructure is configured to be in a first form when an electric field is not applied, and
 wherein the variable microstructure is configured to be deformed and in a second form when the electric field is applied.

2. The projection module according to claim 1, further comprising a spacer configured to divide the accommodating cavity into a first cavity and a second cavity, the first light source being arranged in the first cavity, and the second light source being arranged in the second cavity.

3. The projection module according to claim 2, wherein the spacer has one end abutting against the base, and the other end abutting against the optical element.

4. The projection module according to claim 1, wherein two second light sources are provided, and each of the two second light sources is correspondingly arranged on a first side or a second side of the first light source; and
 two diffusion areas are provided, each of the two diffusion areas is correspondingly arranged on a first side or a second side of the diffraction area, and each of the two diffusion areas corresponds to a different one of the two second light sources.

5. The projection module according to claim 1, wherein the first light source comprises a first substrate and a first light-emitting unit arranged on the first substrate.

6. The projection module according to claim 5, wherein the first light-emitting unit comprises a plurality of first light-emitting units, each first light-emitting unit is configured to be independently controlled, and a divergence angle of each first light-emitting unit is less than 20 degrees.

7. The projection module according to claim 6, wherein a first part of the plurality of the first light-emitting units have a first range of divergence angles, a second part of the plurality of the first light-emitting units have a second range of divergence angles, and the first range is different from the second range.

8. The projection module according to claim 1, wherein the second light source comprises a second substrate and a second light-emitting unit arranged on the second substrate.

9. The projection module according to claim 8, wherein the second light-emitting unit comprises a plurality of second light-emitting units, each second light-emitting unit is configured to be independently controlled, and a divergence angle of each second light-emitting unit is less than 7 degrees.

10. The projection module according to claim 1, wherein when the variable microstructure is in the first form, the variable microstructure allows the light passing through the diffusion area to form a surface light source; and when the variable microstructure is in the second form, the variable microstructure allows the light passing through the diffusion area to form a structured light.

11. The projection module according to claim 1, wherein the second light source is configured to emit light at a first power when the variable microstructure is in the first form, and to emit light at a second power when the variable microstructure is in the second form, and the second power is greater than the first power.

12. The projection module according to claim 1, further comprising a collimation piece arranged between the first light source and the diffraction area, the collimation piece being configured to collimate the light passing through the collimation piece, and allowing the light passing through the collimation piece to reach the diffraction area.

13. A terminal, comprising:
a projection module, comprising:
  a base;
  a housing disposed on the base, and defining an accommodating cavity together with the base;
  a first light source and a second light source disposed on the base and arranged in the accommodating cavity; and
  an optical element disposed on the housing, and comprising a diffraction area aligning with the first light source and a diffusion area aligning with the second light source, the diffraction area being configured to diffract light passing therethrough, and the diffusion area being configured to diffuse light passing therethrough; and
  a driver connected with the first light source and the second light source, and configured to drive the first light source and the second light source to emit light; and
an application processor configured to control the driver to drive the second light source to emit light when an ambient light intensity is less than a preset intensity threshold.

14. The terminal according to claim 13, further comprising an ambient light sensor configured to detect the ambient light intensity.

15. The terminal according to claim 13, further comprising a visible light camera configured to collect a visible light image, and the application processor being configured to calculate the ambient light intensity based on the visible light image.

16. The terminal according to claim 13, further comprising an infrared camera configured to collect an infrared image, wherein the application processor is configured to calculate the ambient light intensity based on the infrared image.

17. The terminal according to claim 13, further comprising a casing and a display screen, the casing comprising a front surface and a back surface facing away from each other, the display screen being mounted to the front surface, and the projection module being mounted to the casing and exposed from the back surface.

18. A projection module, comprising:
a base;
a housing disposed on the base;
a first light source and a second light source disposed on the base and received in the housing; and
an optical element disposed on the housing, and covering the first light source and the second light source,
wherein the optical element comprises a diffraction area aligning with the first light source and a diffusion area aligning with the second light source, in which the diffraction area is configured to diffract light passing therethrough, and the diffusion area is configured to diffuse light passing therethrough,
wherein two second light sources are provided, and each of the two second light sources is correspondingly arranged on a first side or a second side of the first light source, and
wherein two diffusion areas are provided, each of the two diffusion areas is correspondingly arranged on a first side or a second side of the diffraction area, and each of the two diffusion areas corresponds to a different one of the two second light sources.

* * * * *